June 22, 1965 W. WEISS 3,190,008
LINEAR MEASURING DEVICE
Filed Nov. 20, 1962 2 Sheets-Sheet 1
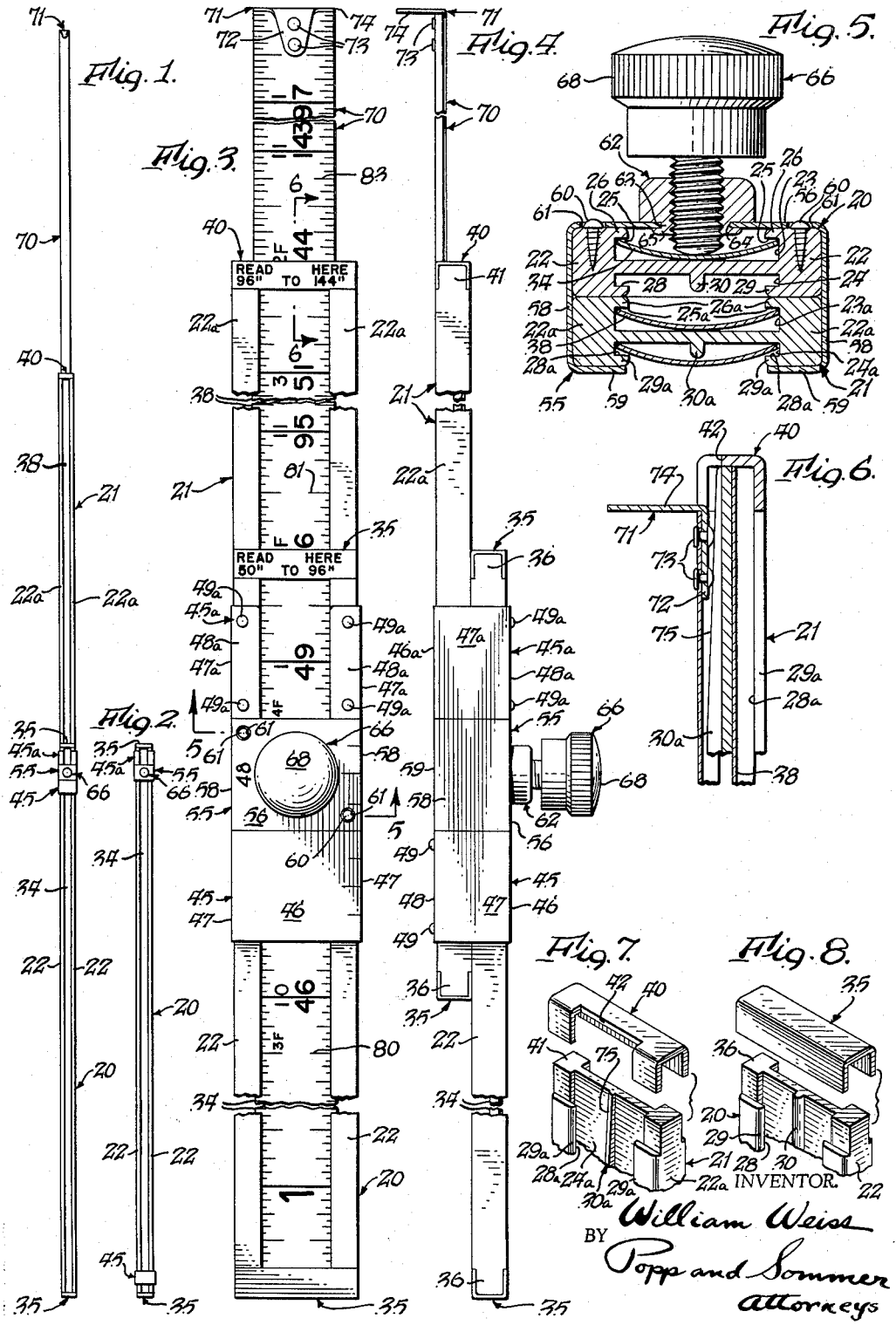
INVENTOR.
William Weiss
BY Popp and Sommer
Attorneys

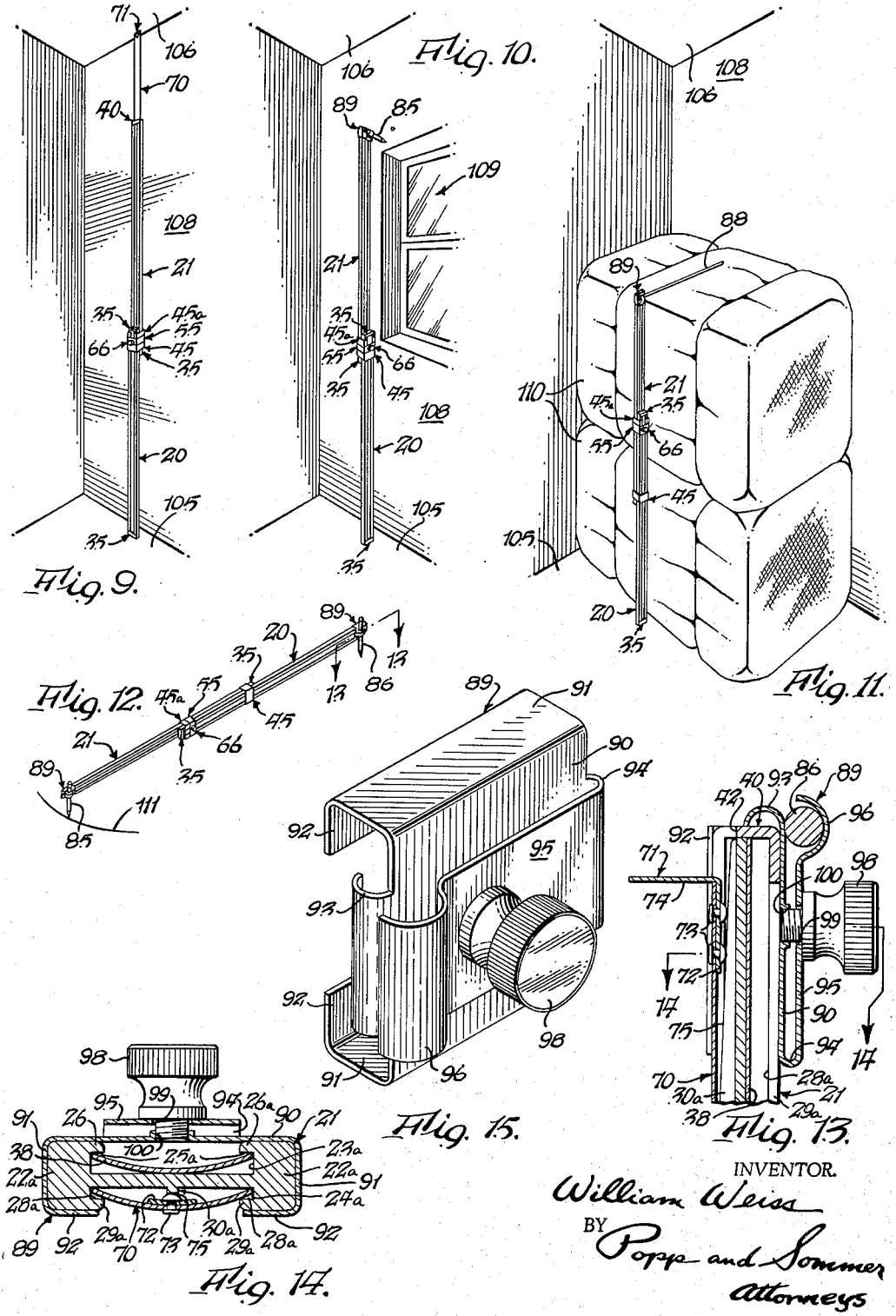

United States Patent Office 3,190,008
Patented June 22, 1965

3,190,008
LINEAR MEASURING DEVICE
William Weiss, Buffalo, N.Y., assignor to Tele-Scale, Inc., Cheektowaga, N.Y., a corporation of New York
Filed Nov. 20, 1962, Ser. No. 238,971
4 Claims. (Cl. 33—161)

This invention relates to a linear measuring device and more particularly to such a device composed of longitudinal extensible sections carrying scales which are calibrated so as to be additive to one another and thereby permit a direct reading of the distance being measured in all extended positions of the measuring device.

One of the principal objects of the present invention is to provide such a measuring device which is of rugged and at the same time low cost construction being composed, for this purpose, of a pair of identical light weight metal extrusions in combination with strip metal scales of concave-convex form in cross section and which are commercially available in quantity at very low cost.

Another object is to provide such a measuring device which is accurate and in particular in which the scales are held in proper registry with the extrusions.

Another object of the invention is to provide such a measuring device which while very light in weight and rugged is self-supporting and will measure long distances, the measuring device illustrated being designed to measure distances up to 12 feet.

Another object of the invention is to provide such a measuring device which can readily be extended or contracted for use in measuring or storing and in which the body sections of the measuring device can reliably be clamped in any position of relative extension.

Another object of the invention is to provide such a measuring device which is adapted for measuring both inside and outside measurements as well as purely linear distances.

Another object of the invention is to provide such a measuring device which can easily be equipped with pencils, trammel points or rods to adapt the measuring device to special uses such as providing marks on the wall at the same height from the floor as in locating curtain brackets; drawing large circles and laying out large angles; and in measuring the cubage of bulky or irregular objects as in stowing freight to the best advantage.

Another object is to provide such a measuring device which tends to retain both its extended position and also its contracted position and in which the body elements of the measuring device can be clamped in such positions.

Another object is to provide such a measuring device having a very light weight extensible scale which can easily be extended by finger pressure applied to its side and held stationary by similar finger pressure, application of the latching finger pressure being facilitated by a rib against which the scale is placed.

Other objects and advantages of the invention will be apparent from the following description and drawings in which:

FIG. 1 is a front elevational view of a linear measuring device embodying the present invention showing the same fully extended.

FIG. 2 is a similar view showing the measuring device contracted or collapsed.

FIG. 3 is an enlarged fragmentary view similar to FIG. 1 and also showing the measuring device fully extended.

FIG. 4 is a fragmentary side elevational view of the measuring device as illustrated in FIG. 3.

FIG. 5 is a further enlarged horizontal section taken generally on line 5—5, FIG. 3.

FIG. 6 is an enlarged fragmentary vertical central fore-and-aft section taken along line 6—6, FIG. 3 but showing the parts in a different position from that illustrated in FIG. 3.

FIG. 7 is a perspective exploded view of parts of the upper end of the measuring device illustrating the construction thereof.

FIG. 8 is an exploded perspective view of other ends of the body parts of the measuring device.

FIG. 9 is a diminative perspective view of the measuring device showing the same used for measuring the height of a room.

FIG. 10 is a similar view showing the same used for marking the position of wall brackets for the curtains of a window.

FIG. 11 is a similar view showing the measuring device used for determining the height of a stack of bales in a truck or the like to permit calculation of the most efficient use of this space for additional merchandise.

FIG. 12 is a view showing the measuring device used for describing large circles on a horizontal surface or for laying out horizontal angles.

FIG. 13 is a longitudinal central section taken generally on line 13—13, FIG. 12 and particularly illustrating the clamp for holding a pencil, rod or pointer on the either end of the measuring device to permit the uses illustrated in FIGS. 10, 11 and 12.

FIG. 14 is a transverse section taken generally on line 14—14, FIG. 13.

FIG. 15 is a perspective view, detached from the measuring device, of the clamp so used to attach a pencil, rod, or pointer to the measuring device to permit the uses illustrated in FIGS. 10–12.

The linear measuring device of the present invention comprises a plurality of members which are longitudinally extensible with reference to one another and desirably carry scales which are used in conjunction with one another to enable the quick determination of any particular degree of extension of the measuring device. The measuring device also includes clamping members for holding the body portions of the measuring device at any extended position and includes end clamps which permit the attachment of pencils, rods or pointers to permit the use of the measuring device for many different purposes.

To this end the measuring device has two body portions 20 and 21 these being preferably made of extruded light weight metal of the same cross sectional form. Thus the main body portion 20 is in the form of an extrusion of generally rectangular cross section having longitudinal marginal enlarged ribs or beads 22 forming between them a longitudinal central channel 23 on one side and a longitudinal central channel 24 on its opposite side. At the sides of the channel 23 the side ribs or beads of the extrusion are undercut as indicated at 25 to form opposing flanges 26. At the sides of the channel 24 the beads or ribs 22 are undercut as indicated at 28 to provide opposing flanges 29 and this channel 24 is additionally provided with a central longitudinal rib 30.

As previously indicated the other or secondary body section 21 is in the form of an extrusion which is identical in cross section and the same reference numerals have therefore been applied and distinguished by the suffix "a."

A metal scale 34 of concavo-convex cross section is inserted in the channel 23 of the main body section 20, its longitudinal edges being contained within the small side channels or undercuts 25 formed by the flanges 26. Preferably this scale 34 is held under slight transverse compression in these undercuts so that the scale is held against rattling. This scale 34 is held against endwise displacement from the channel 23 by caps 35 provided at opposite ends of the main body section 20. These caps 35, as best shown in FIG. 8, comprise a single piece of metal which is U-shaped in cross section and embraces the reduced ends 36 of the side ribs or beads 22 of the main body section 20, preferably being secured to these reduced ends by an adhesive (not shown) or any other suitable manner.

A similar end cap 40 is similarly mounted on the inboard end of the secondary body member 21, this end cap serving to prevent endwise displacement of a metal scale 38 of concavo-convex cross section contained within its channel 23a with its edges confined within the smaller side undercuts 25a provided between the ribs or beads 26a. The outboard end of the secondary body section 21 can be closed by the end cap 40 as best illustrated in FIG. 7. This end cap is of U-shaped form in cross section and at its ends embraces the outboard reduced ends 41 of the side ribs or beads 26a of the secondary body section 21. An important feature of the end cap 40 is, however, that one side is cut away or recessed, as indicated at 42, so that the outboard end of the channel 24a is exposed for a purpose which will presently appear.

The main and secondary body sections 20 and 21 are connected so as to be slidable longitudinally relative to each other so as to permit these sections to be extended to different lengths. To this end a U-shaped bracket 45 is secured to the inboard end of the secondary body section 21 in embracing end sliding relation to the main body section 20. This bracket 45 is shown as having a web or strap 46 extending across the front face of the main body section 20 and as having side legs 47 which extend along the outer side faces of the ribs 22, 22a of the body sections 20 and 21 and as having flanges 48 which extend around the ribs 22a of the secondary body section 21 and are secured to these ribs by screws 49 or in any other suitable manner.

The outboard end of the main body section 20 is slidingly secured to the secondary body section 21 by a U-shaped bracket 45a identical with the bracket 45 but secured to the former and embracing the latter. To this end this bracket 45a has a central web or strap 46a which embraces the rear sides of the ribs 22a of the secondary body section 21 and having side legs 47a which extend along the outer side faces of the ribs 22a and 22 and terminate in flanges 48a which are secured to the ribs 22 by screws 49a or in any other suitable manner.

Means are provided for clamping the main and secondary body sections 20 and 21 together in any longitudinal position of relative adjustment. To this end a U-shaped bracket 55 embraces the main and secondary body sections 20 and 21 at the outboard end of the former, preferably immediately adjacent the bracket 45a. As best shown in FIG. 5, this bracket 55 comprises a central web or strap 56 across the front faces of the side ribs or beads 22 of the main body section 20 and has side legs 58 which engage the outer side faces of the ribs 22 and 22a which terminate in flanges 59 embracing the rear faces of the ribs 22a. The bracket 55 can be held against longitudinal displacement relative to the main body section 20 by screws 60 having their heads arranged in holes 61 in this bracket. By this mounting the bracket 55 has a floating mounting in that it is free to move transversely of the body portions 20, 21 in clamping them together as hereinafter described.

This bracket is shown as having secured thereto a nut 62, this nut having a neck 63 extending through an opening 64 through the web or strap 56 of the bracket 55 and peened over as indicated at 65. A clamping screw 66 having an end thumb nob 68 is supported by the nut 62 and its threaded end is arranged to press tightly against the scale 34 contained in the channel 23 of the main body section 20. It will be seen that by extending the main and secondary body sections 20 and 21 to any relative position and then tightening the screw 66, these body sections will be retained in such position.

The linear measuring device includes a third extensible section indicated generally at 70, this being in the form of a sheet metal scale of concavo-convex form in cross section. This scale is shown as being slidably contained within the channel 24a of the secondary body section 21 with its longitudinal edges being contained within the small channels or undercuts 28a formed by the flanges 29a. Preferably the scale 70 is held under slight transverse compression in these undercuts so as to offer a slight resistance to sliding movement of the scale 70 along the channel 24a. The outboard end of the scale 70 projects through the opening provided by the cutaway or recess 42 in the cap 40 cemented to the outboard end of the secondary body section as previously described. This outboard end of the scale 70 is preferably provided with an L-shaped end head 71 having an attaching leg 72 secured to the end of the scale 70 by rivets 73 and a transverse leg 74 projecting over the end of the scale 70.

In order to frictionally secure this scale 70 in its contracted or fully housed position, the rib 30a in the channel 24a of the secondary body section 21 is inclined or tapered at the outboard end of the secondary body section 21 as indicated at 75 in FIG. 6. Upon drawing the scale 70 fully into its channel 24a in the secondary body section 21, the rivets 73 for the end head 71 at the outboard end of the scale 70 wedge against this incline 75 thereby to provide frictional resistance to the withdrawal of the scale. Accordingly, deliberate manual effort is required to pull out the scale 70 in addition to the frictional resistance offered to the edges of the scale.

The sheet metal scales 34, 38 and 70 are shown as calibrated in inches and feet and for convenience in the use of the measuring device, these scales are preferably calibrated as follows:

Assuming the main body section 20 to be 50 inches in length the scale 34 contained within this main body section contains the calibrations 80 from zero at the extreme inboard end of this main body section to 50 inches at the extreme outboard end of this main body section, this 50 inch line being at the top of the cap 35 of this main body section 20. The calibrations of the sheet metal scale 38 are in reverse, that is, the calibrations 81 of this scale start at 50 inches at the extreme outboard end of the secondary body section 21 and terminate at 96 inches at the extreme inboard end of this scale. It will therefore be seen that a direct reading can be made from the extended scale without the necessity of undertaking any arithmetic. Thus a direct reading can be taken on the scale 34 for any measurement up to 50 inches. If the measurement is greater than 50 inches the secondary body section 21 is extended and a direct reading of the exact measurement can be made at the outer edge of the outboard cap 35 of the main body section 20, using the scale 38.

If the measurement is longer than both body sections 20 and 21 the third sheet metal scale 70 is extended to take the measurement and the calibrations 83 of this scale start at 96 inches at its extreme outboard end. Since at this time the two body sections 20 and 21 have been extended their full length a direct reading of the overall distance can be taken from the calibrations 83 on the scale 70.

In order to increase the utility of the linear measuring device, means are provided for attaching a pencil 85, pointer 86 or rod 88 to one or both remote extremities of the main and secondary body sections 20 and 21. For this purpose the holder 89 best illustrated in FIGS. 13, 14 and 15 can be attached to the measuring device as above described and is shown as constructed as follows:

The holder 89 is shown as having a body made of sheet metal including a central web or strap 90 adapted to lay against the front or rear faces of the ribs 22, 22a of either of the body sections 20 or 21 and the body of the holder 89 also includes side legs 91 engageable with the side faces of these ribs 22, 22a and which terminate in flanges 92 adapted to engage the far faces of these ribs 22, 22a as best shown in FIG. 15. One edge of the web or strap 90 is extended to provide a rounding channel-shaped extension 93 extending toward the flanges 92 and forming an end stop attached to engage the end cap of either of the body sections 20 and 21 to position properly the holder 89. The other edge of the web 90 of the body 89 is extended to provide a channel-shaped hinge 94 for an integral clamping plate 95, the opposite outboard end of which is formed to provide a rounding channel-shaped extension 96 the concave side of which opposes the web or strap 90 of the holder and is adapted to clamp either the pencil 85, the pointer 86 or the long rod 88 against the web or strap 90. To this end any suitable type of screw can be provided for drawing the clamping plate 95 toward the body of the holder 89. This is shown as being in the form of a thumb screw 98 having its threaded shank extending through an opening 99 in the clamping plate 95 and having threaded engagement with a bore 100 in the web or strap 90. An important feature of this holder 89 is that the rounding part 96 of the clamping plate 95 is positioned so as to hold the axis of the pencil 85 or pointer 86 in exact alinement with the outboard edge of the stop 93 which in turn is positioned in abutting relation to the corresponding end cap of either the main body section 20 or the secondary body section 21.

Various uses of the measuring device are illustrated in FIGS. 9–12. In the use of the measuring device, if the distance is less than 50 inches, the device in its fully collapsed state illustrated in FIG. 2 is merely laid along the distance to be measured with its inboard end positioned at one end of the distance and a direct reading of the distance is taken on the scale 34.

If the distance to be measured is greater than 50 inches, the thumb screw 66 is loosened so that the two body sections 20 and 21 can be extended lengthwise relative to each other with the inboard end of the main body 20 at one end of the distance to be measured. The outboard end of the secondary body section 21 is extended to the opposite end of this distance and the thumb screw 66 can be tightened so as to retain the parts in this position. In this position a direct reading can be taken on the scale 38 inasmuch as the calibrations 81 of the scale 38 commence at 50 inches at the outboard end of the secondary body section 21, this eliminating the necessity of having to add the readings together. It will also be seen that this extension of the scale is particularly useful in making inside measurements because it is merely necessary to extend the two body sections 20, 21 to the extent permitting between opposing surfaces which limit the distance to be measured and then tighten the thumb screw 66.

If the distance to be measured is greater than the combined length, namely 96 inches, of the two body sections 20, 21 the user places his thumb against the exposed convex face of the scale 70 and slides it longitudinally out from the secondary body member 21, this being permitted by the provision of the recess 42 in the end cap 40 for this secondary body section 21. This operation is illustrated in FIG. 9 to measure the distance between the floor 105 and ceiling 106 of a room, and to determine this distance, which otherwise would be difficult to measure, it is merely necessary to make a direct reading of the calibration 83 on the scale 70 at the outboard edge of the cap 40 for the secondary body section 21. This can be done because these calibrations 83 of the scale 70 start at the outboard end of the scale with a 96 inch calibration, 96 inches being the assumed combined length of the body sections 20 and 21.

In extending the scale 70 it can readily be held in position to permit reading of its calibrations 83 by the presence of the rib 30a in the channel 24a which slidingly contains the scale 70. Thus the operator, after extending the measuring device the correct distance to make the measurement, merely has to place his thumb against the convex side of this scale 70 sufficiently firmly to bring the scale into engagement with the rib 30a and thereby manually clamp this scale 70 in position until the exact reading of its calibrations 83 is taken.

If it is desired to make a number of marks on the wall 108 of the room or at the same distance, say, from the floor 105, as in placing curtain brackets (not shown) at the same height above a window 109, the holder 89 is slipped over the outboard end of the secondary body section 21 and a pencil 85 is clamped in this holder. To do this, the body portion of the holder 89, which is C-shaped in cross section is slipped over the outboard end of the secondary body section 21 and the stop 93 is brought into engagement with the end of the cap 40 for this secondary body section. In this position of the holder 89, the channel-shaped end 96 of its clamping plate 95 is horizontal and the pencil 85 is placed between this channel-shaped end 96 of the clamping plate 95 and the web or strap 90 of the body of the holder. The screw 98 is thereupon turned to clamp the pencil in position. The sections 20 and 21 are then extended to the desired height of the curtain bracket, this being a direct reading taken on the scale 38 following loosening the thumb screw 66 to extend the body sections 20 and 21, following which the thumb screw is retightened with the measuring device in this condition. It will be seen that by placing the inboard end of the main body section 20 on the floor and bringing the point of the pencil 85 against the wall 108 as illustrated in FIG. 10, any number of marks can be made, as for curtain brackets, on this wall and all of these marks will be exactly the same height from the floor.

In FIG. 11 is illustrated another use of the measuring device in which the pencil 85 is substituted by the long rod 88. This rod permits the measuring and calculation of the cubage of merchandise, such as bales 110, within a room which might, of course, be the inside of a railroad car or truck body. By being able to take a direct reading of, say, the height of the bales 110 the trucker knows whether he can place another bale on top or otherwise advantageously stow more merchandise in the space or room for maximum utility of the entire space.

In FIG. 12 is illustrated a holder 89 provided at each opposite extremity of the body sections 20 and 21 with a metal trammel point 86 clamped in one end and the pencil 85 clamped in the other. The points of both projecting in the same direction. With such an arrangement it will be seen that it is possible to mark a large circle 111 on a horizontal, vertical or any other surface. Accordingly the measuring device can be used to lay out large circles when such is required. This use also leads to the laying out of large angles through the exercise of simple plane geometry.

From the foregoing it will be seen that the measuring device of the present invention is extremely simple to use and has the capability of performing many important and useful functions, and achieves the objectives and has the many advantages previously set forth.

I claim:
1. A linear measuring device comprising a pair of elongated metal bars arranged in face-to-face relation to each other, means connecting said bars for longitudinal sliding extensible movement with reference to each other, at least one of said bars having a longitudinal channel in its face opposing the other bar and the other of said bars having a longitudinal channel in its face remote from said one of said bars whereby said channels are visible from the same side of the measuring device, an elongated scale made of sheet material in each of said channels and extending substantially the full length of said bars, means retaining said scales in said channels, at least one of said bars being provided with another longitudinal channel in its side remote from its first mentioned channel, another scale of sheet material having its edges slidingly retained in undercuts at the sides of said another channel to be extensible from the end of said another channel, said another channel being provided with a longitudinal rib along its center and integral with the bar containing said another channel, and said another scale be- ing of concavo-convex form in cross section with its concave face facing said rib.

2. A linear measuring device as set forth in claim 1 wherein said another scale has an end head attached to its outboard extremity and wherein said rib is inclined to wedge against portions of said end head when said another scale is fully retracted.

3. A linear measuring device, comprising a pair of parallel elongated metal bars arranged in face-to-face relation to each other, means connecting said bars for longitudinal sliding extensible movement with reference to each other, at least one of said bars having a longitudinal channel in its face opposing the other bar and the other of said bars having a longitudinal channel in its face remote from said one of said bars whereby said channels are visible from the same side of the measuring device, an elongated scale made of sheet material in each of said channels and extending substantially the full length of said bars, means retaining said scales in said channels, and a pencil holder comprising a sheet metal body which is C-shaped in cross section to fit around one of said bars and includes one side edge extension forming a stop engaging the end of said one of said bars and an opposite side extension forming a clamping plate holding said pencil or the like against the extension of said sheet metal body.

4. A linear measuring device as set forth in claim 3 wherein the outboard extremity of said clamping plate is in the form of a rounding channel having a concave side facing said stop.

References Cited by the Examiner
UNITED STATES PATENTS

| | | | |
|---|---|---|---|
| 416,719 | 12/89 | Curtis | 33—158 X |
| 495,438 | 4/93 | Stowell | 33—74 |
| 978,446 | 12/10 | Gasstrom | 33—161 |
| 2,480,725 | 8/49 | Gilbert | 33—137 |
| 2,740,201 | 4/56 | Swanson | 33—161 |

FOREIGN PATENTS 19,984 1892 Great Britain.

ISAAC LISANN, *Primary Examiner.*